United States Patent
Singhal et al.

(10) Patent No.: US 12,271,272 B1
(45) Date of Patent: Apr. 8, 2025

(54) ORCHESTRATING PER-SLICE PER-CONTAINER BACKUP SESSIONS FOR EFFICIENT RESOURCE USAGE

(71) Applicant: Dell Products L.P., Round Rock, TX (US)

(72) Inventors: Upanshu Singhal, Bangalore (IN); Shelesh Chopra, Bangalore (IN); Ashish Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/472,675

(22) Filed: Sep. 22, 2023

(51) Int. Cl.
G06F 11/14 (2006.01)

(52) U.S. Cl.
CPC ...... *G06F 11/1464* (2013.01); *G06F 2201/84* (2013.01)

(58) Field of Classification Search
CPC .......................... G06F 11/1464; G06F 2201/84
See application file for complete search history.

(56) References Cited

U.S. PATENT DOCUMENTS

| | | | |
|---|---|---|---|
| 11,140,455 B1 * | 10/2021 | Woodruff | H04N 21/2187 |
| 2014/0173618 A1 * | 6/2014 | Neuman | G06F 9/5066 |
| | | | 718/104 |
| 2017/0126469 A1 * | 5/2017 | Liang | H04L 41/042 |
| 2017/0177860 A1 * | 6/2017 | Suarez | G06F 21/53 |
| 2017/0177877 A1 * | 6/2017 | Suarez | G06F 21/6218 |
| 2017/0180346 A1 * | 6/2017 | Suarez | G06F 9/45558 |
| 2017/0208019 A1 | 7/2017 | Shimojou | |
| 2018/0115514 A1 * | 4/2018 | Chou | H04L 63/20 |
| 2018/0295201 A1 * | 10/2018 | Dornemann | H04L 67/56 |
| 2022/0334925 A1 | 10/2022 | Rakesh et al. | |
| 2022/0398168 A1 * | 12/2022 | Singhal | G06F 11/3433 |

OTHER PUBLICATIONS

De Simone, L., Di Mauro, M., Natella, R., & Postiglione, F. (2022). A latency-driven availability assessment for multi-tenant service chains. IEEE Transactions on Services Computing, 16(2), 815-829. (Year: 2022).*

(Continued)

*Primary Examiner* — William Spieler
(74) *Attorney, Agent, or Firm* — Chamberlain, Hrdlicka, White, Williams & Aughtry; Aly Z. Dossa

(57) ABSTRACT

A method for performing a backup operation, the method comprising receiving a backup operation request for an asset, identifying a queue comprising the plurality of slices, wherein each slice references a separate portion of the asset, sending a first backup request to a proxy manager to instantiate a container for each of a plurality of backup sessions, wherein each backup session corresponds to a slice of the plurality of slices, receiving, from the proxy manager, a notification that one of the number of backup sessions is complete and a corresponding container has been torn down, making a second determination that there is an additional slice on a second queue associated with a second asset, and sending, based on the second determination, a backup request to the proxy manager to instantiate a new container for the additional slice associated with the second asset.

20 Claims, 13 Drawing Sheets

(56) References Cited

OTHER PUBLICATIONS

Hung, W. C., & Lee, C. R. (Dec. 2022). CSM-DBEN: Container Storage Manager for Data Backup on Edge Nodes. In 2022 IEEE International Conference on Cloud Computing Technology and Science (CloudCom) (pp. 105-112). IEEE. (Year: 2022).*

Huang, Z. (2021). Availability-Aware Resource Allocation for Containerized Network Functions (Doctoral dissertation, Université d'Ottawa/University of Ottawa). (Year: 2021).*

Dell Technologies, Dell PowerProtect Data Manager: Dynamic NAS Protection, H18883.3, Apr. 2023, 36 pages.

* cited by examiner

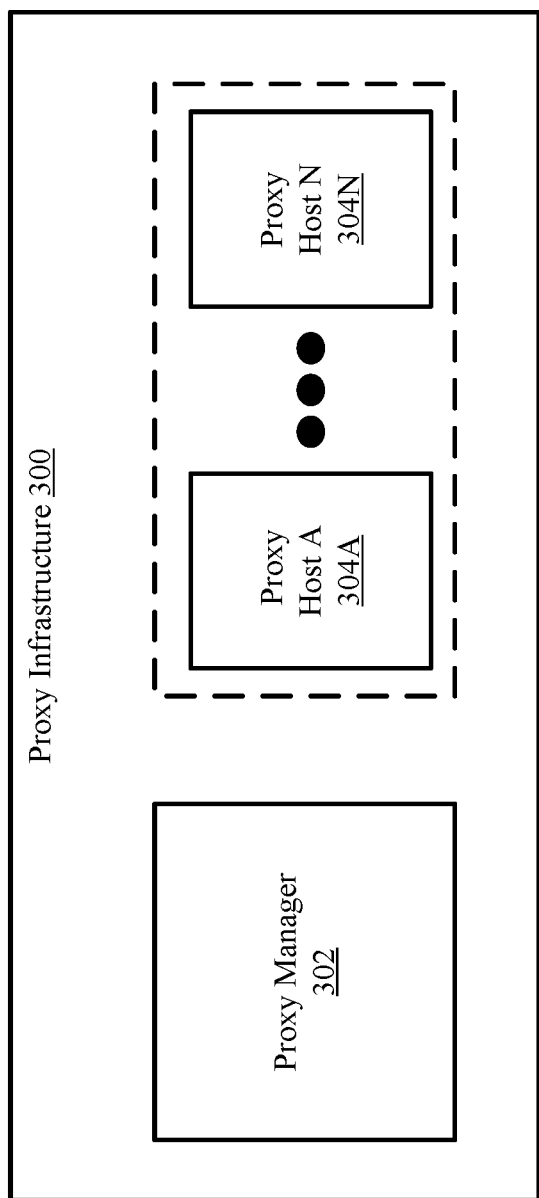
FIG. 3.1

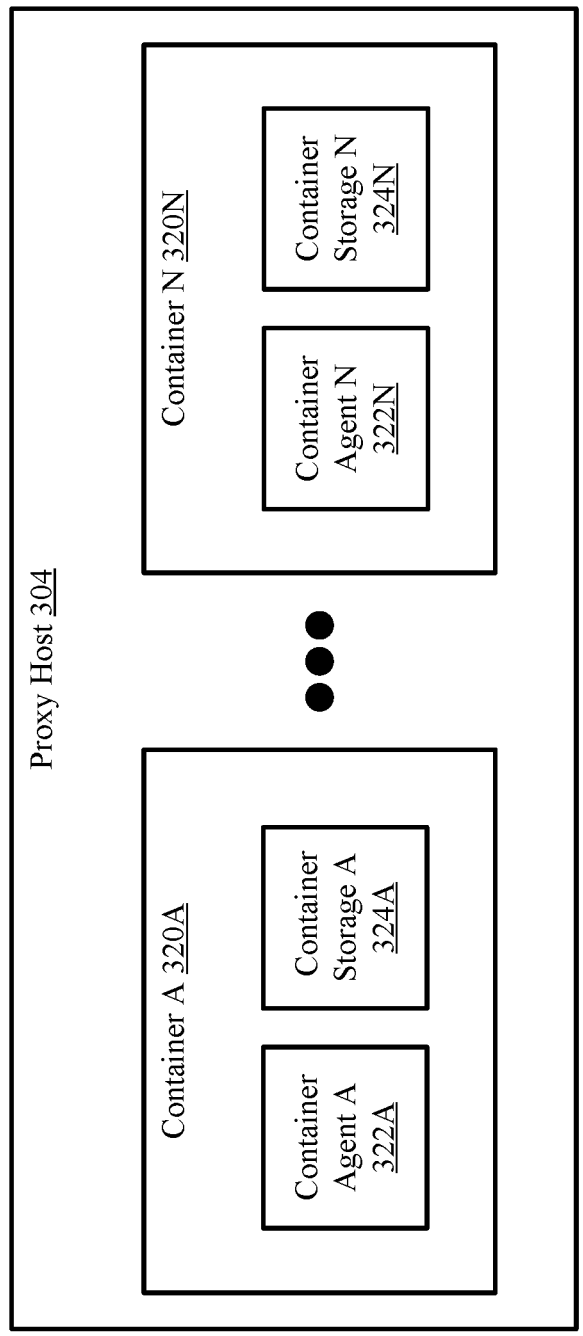
FIG. 3.2

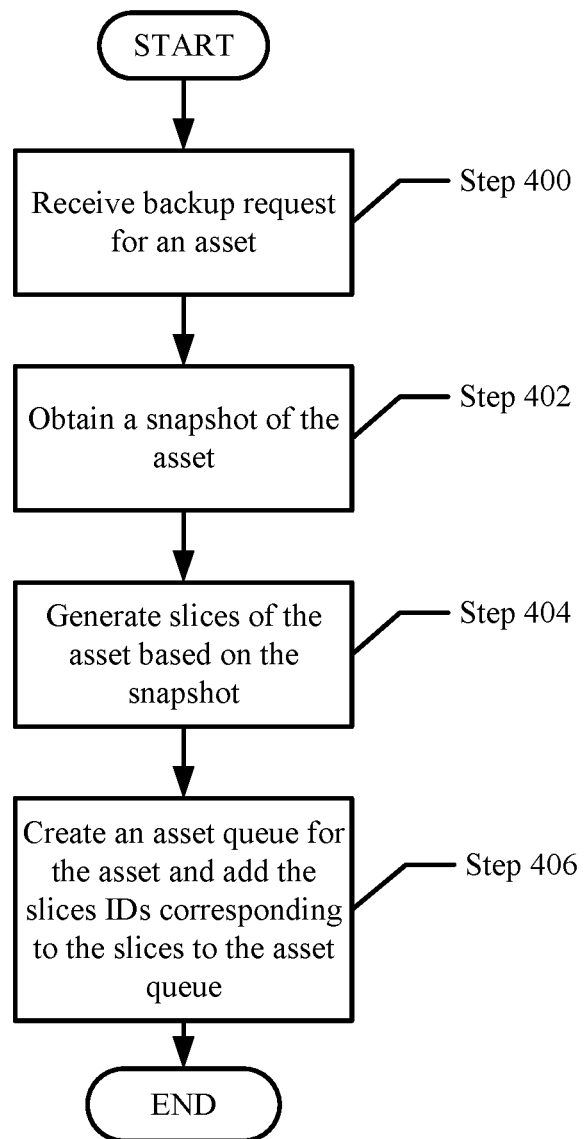
FIG. 4.1

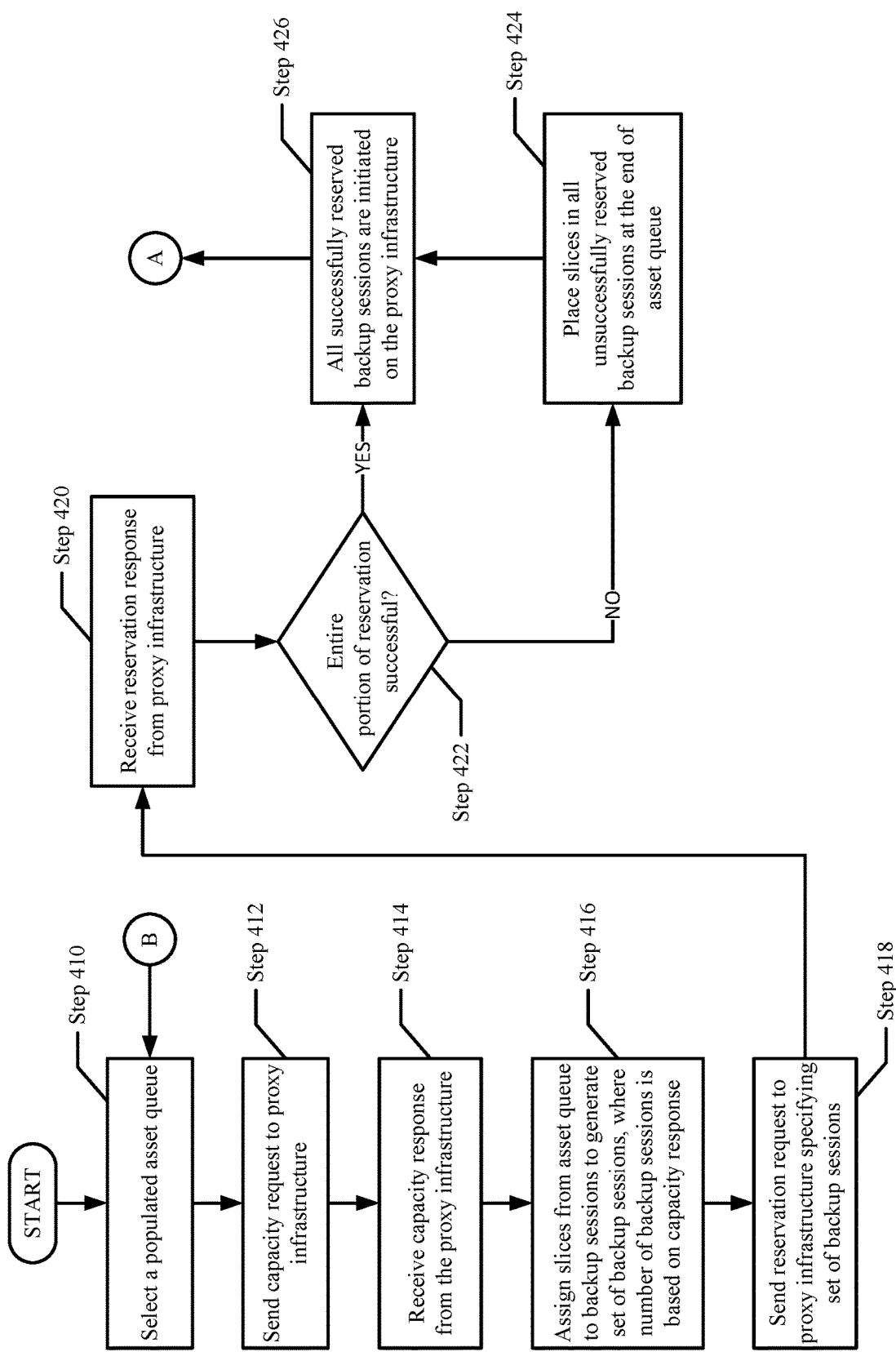
FIG 4.2

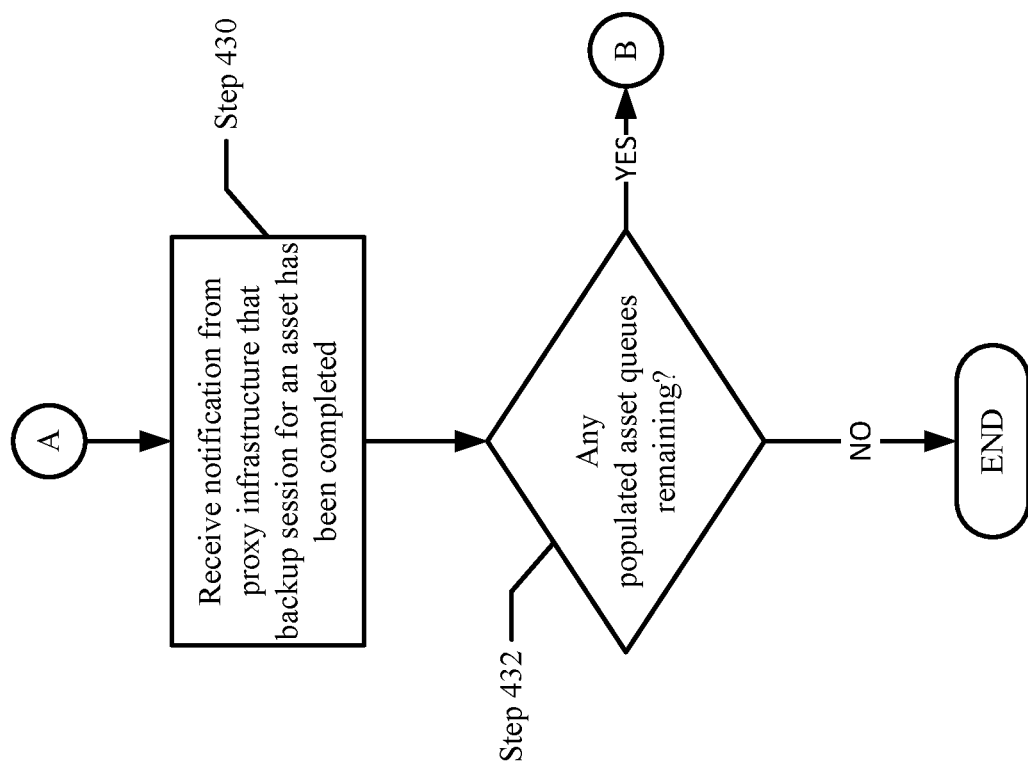
FIG 4.3

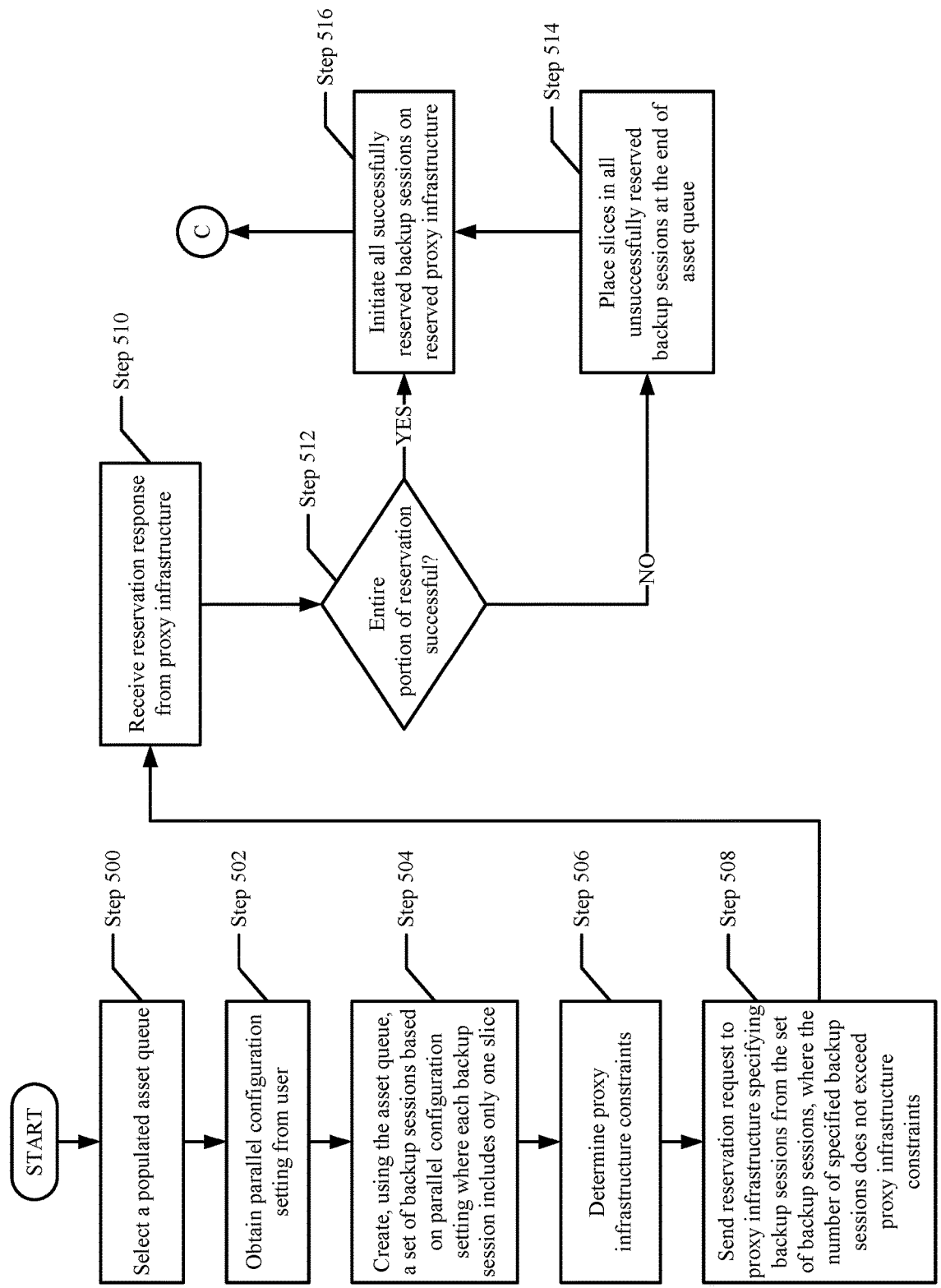
FIG 5.1

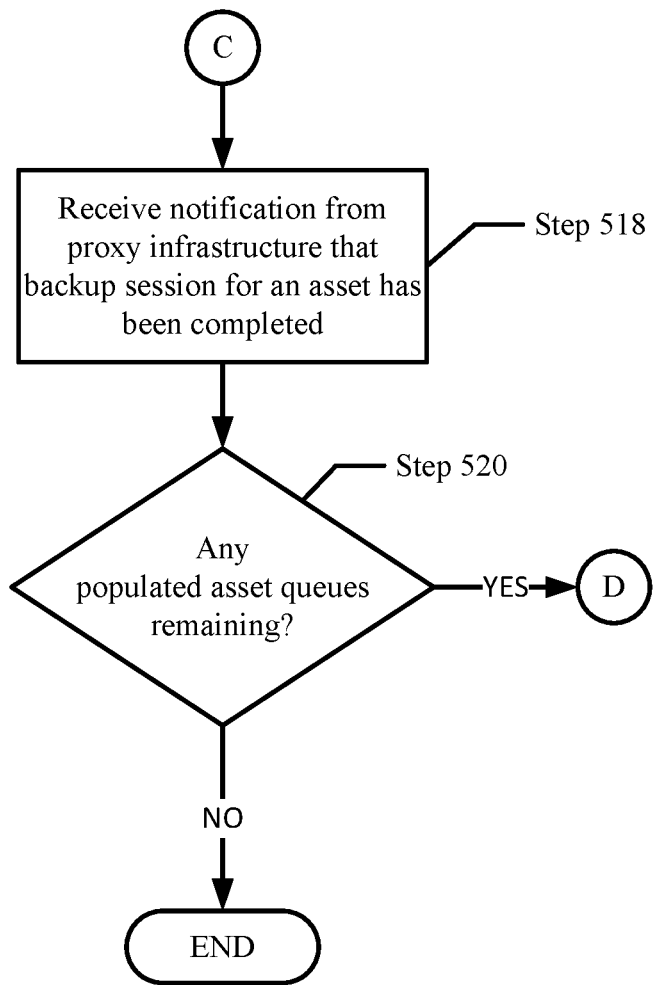
FIG. 5.2

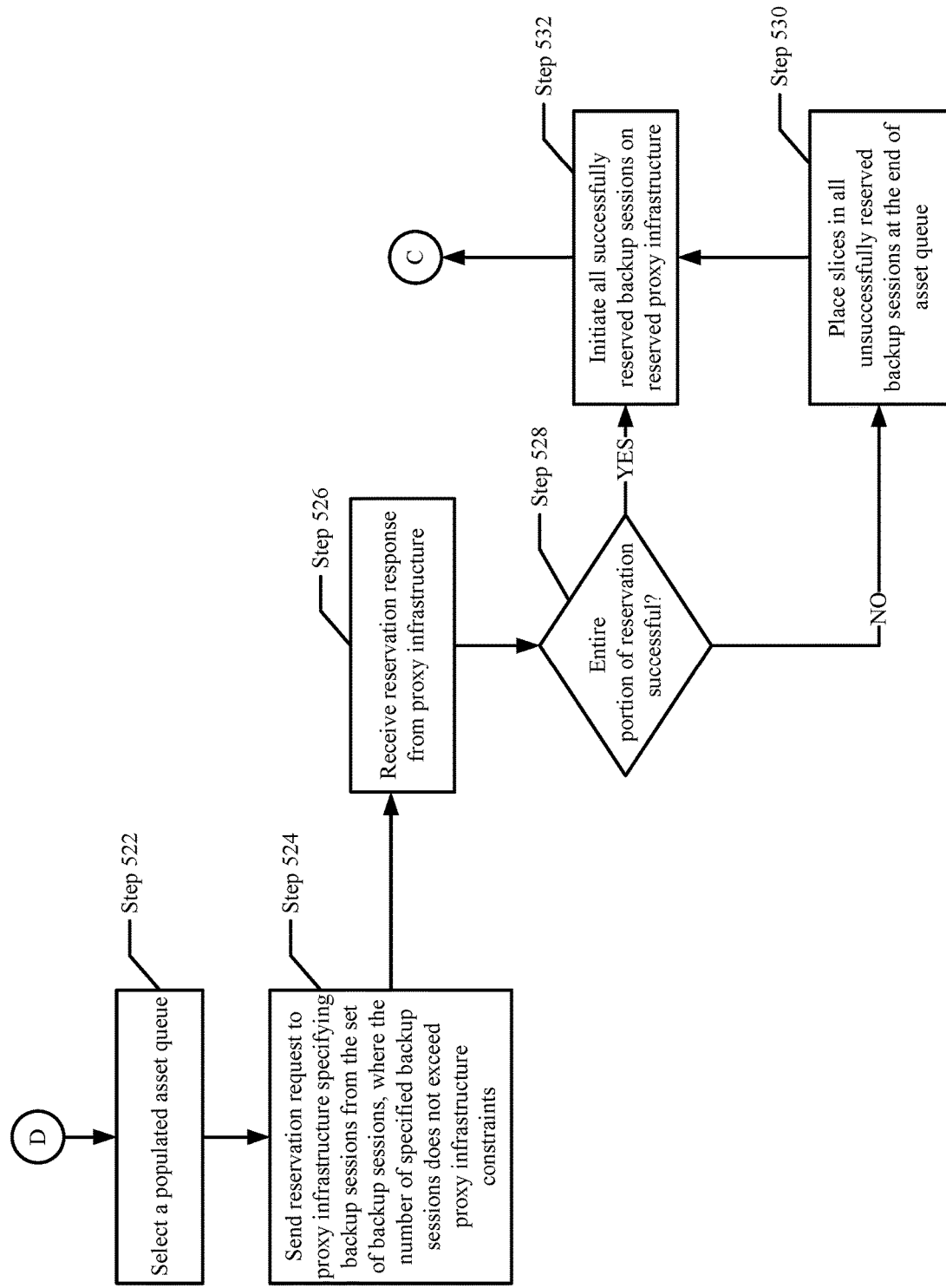
FIG 5.3

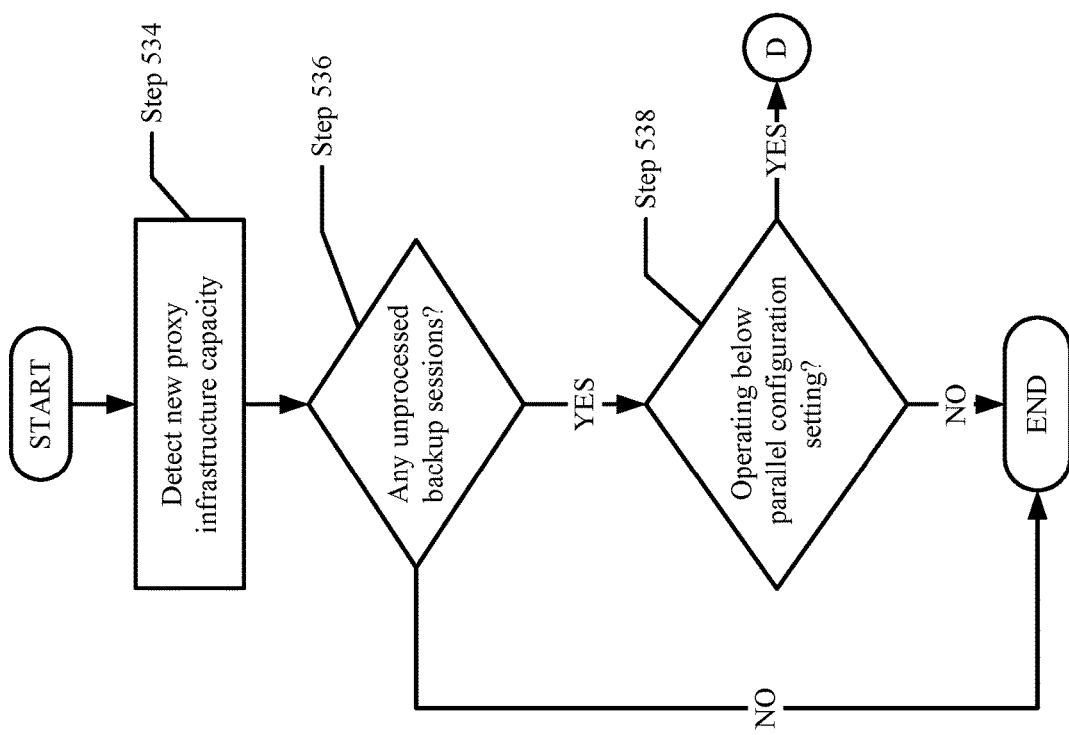
FIG. 5.4

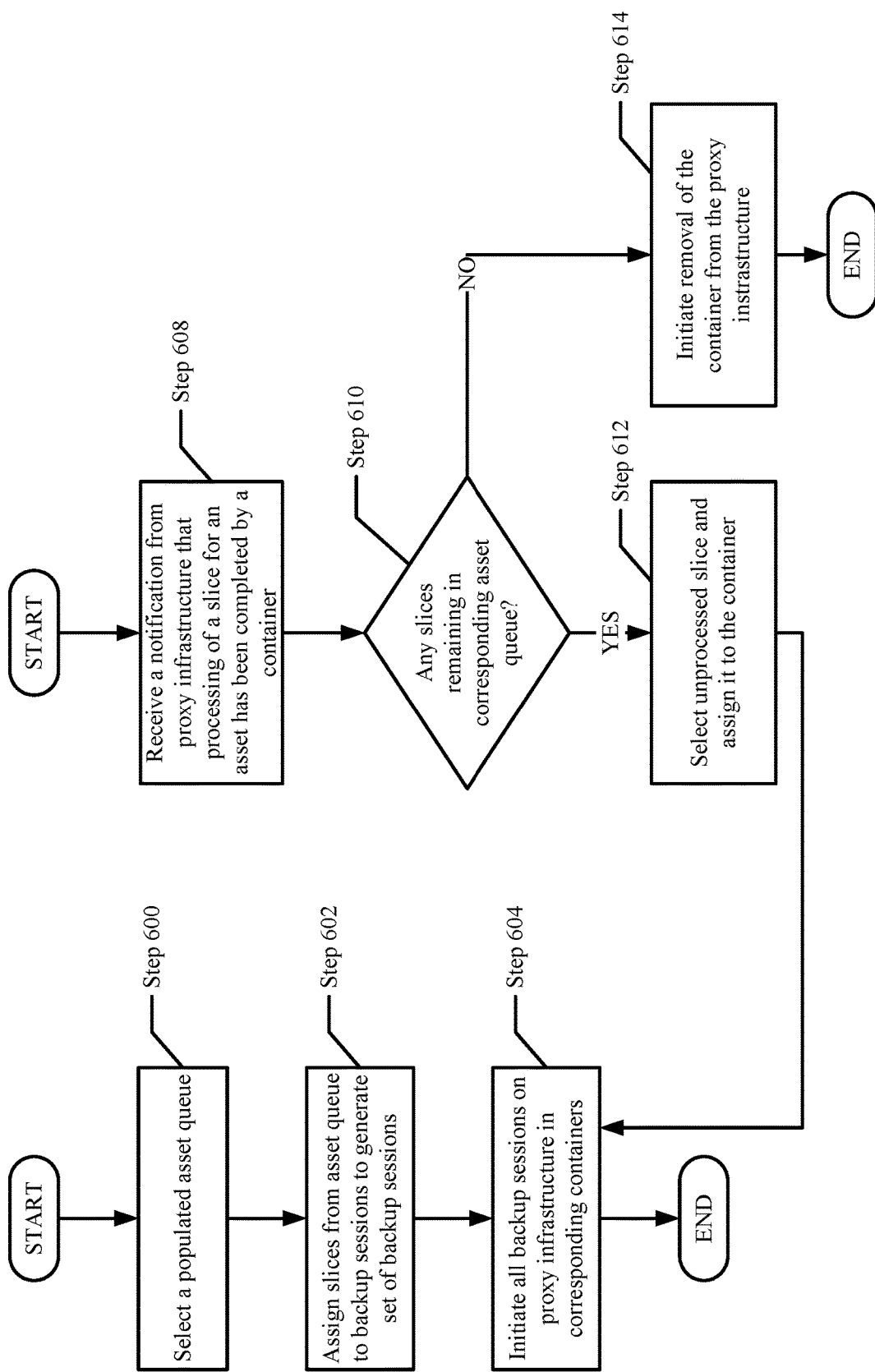
FIG. 6.1
FIG. 6.2

ORCHESTRATING PER-SLICE PER-CONTAINER BACKUP SESSIONS FOR EFFICIENT RESOURCE USAGE

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices and the ability to adequately backup data.

BRIEF DESCRIPTION OF DRAWINGS

Certain embodiments of the technology will be described with reference to the accompanying drawings. However, the accompanying drawings illustrate only certain aspects or implementations of the technology by way of example and are not meant to limit the scope of the claims.

FIG. 3.1 shows a diagram of proxy infrastructure in accordance with one or more embodiments of the technology.

FIG. 3.2 shows a diagram of a proxy host in accordance with one or more embodiments of the technology.

FIGS. 4.1-4.3 shows flowcharts of a method for orchestrating data streams in accordance with one or more embodiments of the technology.

FIGS. 5.1-5.4 shows flowcharts of a method for orchestrating data streams in accordance with one or more embodiments of the technology.

FIGS. 6.1-6.2 shows flowcharts of a method for orchestrating data streams in accordance with one or more embodiments of the technology.

DETAILED DESCRIPTION

Figure 1:
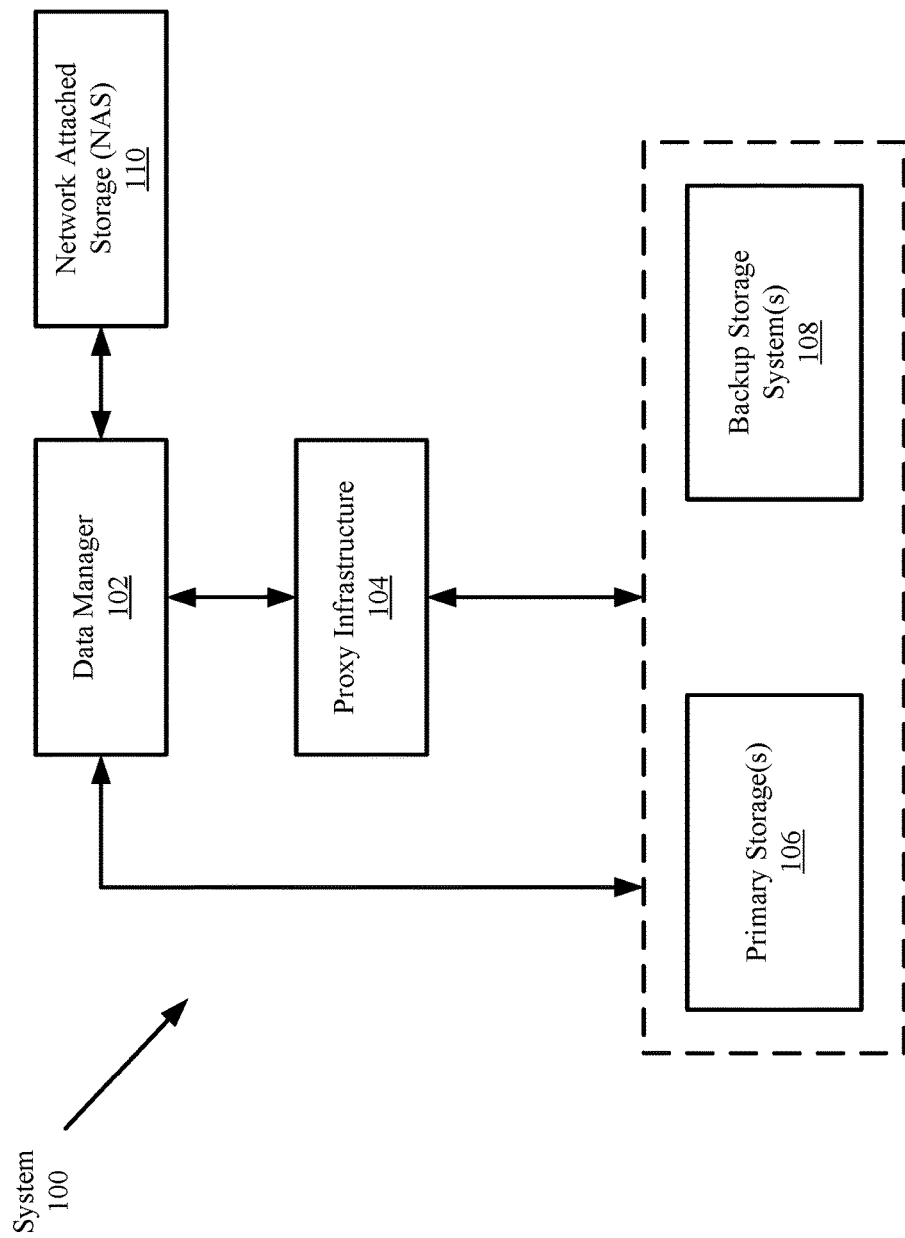
FIG. 1 shows a diagram of a system in accordance with one or more embodiments of the technology.

In general, embodiments of the technology relate to efficiently using backup system resources when backing up assets. In the context of this technology, an asset is data or metadata that is associated with a file, a folder and/or any other data hierarchy (or structure) (e.g., a volume). More specifically, embodiments relate to determine how to efficiently create and process backup sessions on proxy infrastructure (i.e., the infrastructure of the backup system used to generate the backups).

Referring to FIGS. 4.1-4.3, in one embodiment of the technology, a proxy manager (see e.g., FIG. 3.1) uses a reservation mechanism to optimize the creation of backup sessions. In this manner, only the number of backup sessions that the proxy infrastructure can actually process at the time of the reservation request are created and, as such, no (or minimal) resources are wasted in the creation of the backup sessions. Further, once the backup sessions are created, there is a high likelihood that they will be successfully processed as there should be sufficient resources on the proxy infrastructure (e.g., FIG. 1) to process the backup sessions. This minimizes backup sessions being created but not processed within the backup window.

Referring now to FIGS. 4.1 and 5.1-5.4, in one embodiment of the technology, assets are divided into slices. The proxy manager then creates per-slice backup sessions (as compared to FIGS. 4.2-4.3, where there are multiple slices per backup session) and issues a subset of the backup sessions to the proxy infrastructure. Each of these backup sessions is then executed, in parallel, in its own container. Once the backup session in a given container is completed, the proxy manager is notified, and another backup session is issued to the proxy infrastructure. In this manner, the proxy manager is able to maintain processing of backup sessions at an optimal level as the proxy manager is able to manage the workload on the proxy infrastructure on a per-slice basis.

Referring now to FIGS. 4.1 and 6.1-6.2, in one embodiment of the technology, the proxy manager uses a reservation mechanism to optimize the creation of backup sessions, where each backup session includes a set of slices. In this manner, only the number of backup sessions that the proxy infrastructure can actually process at the time of reservation request are created and no (or minimal) resources are wasted in the creation of the backup sessions. Further, once the backup sessions are created, there is a high likelihood that they will be successfully processed, as there should be sufficient resources on the proxy infrastructure to process the backup sessions.

In this embodiment, a container is instantiated in the proxy infrastructure for each backup session. When a slice in the session has been processed, the proxy infrastructure is notified and another slice is added to the backup session. In this manner, the number of backup sessions that are being executed remains relatively constant and the backup session can continue to execute while there are still unprocessed slices for the asset. Further, this embodiment enables the continued use of existing containers (as opposed to tearing down/terminating existing containers for completed backup sessions and creating new containers for each new backup session, see e.g., FIGS. 4.2-4.3 and 5.1-5.4).

Figure 2:
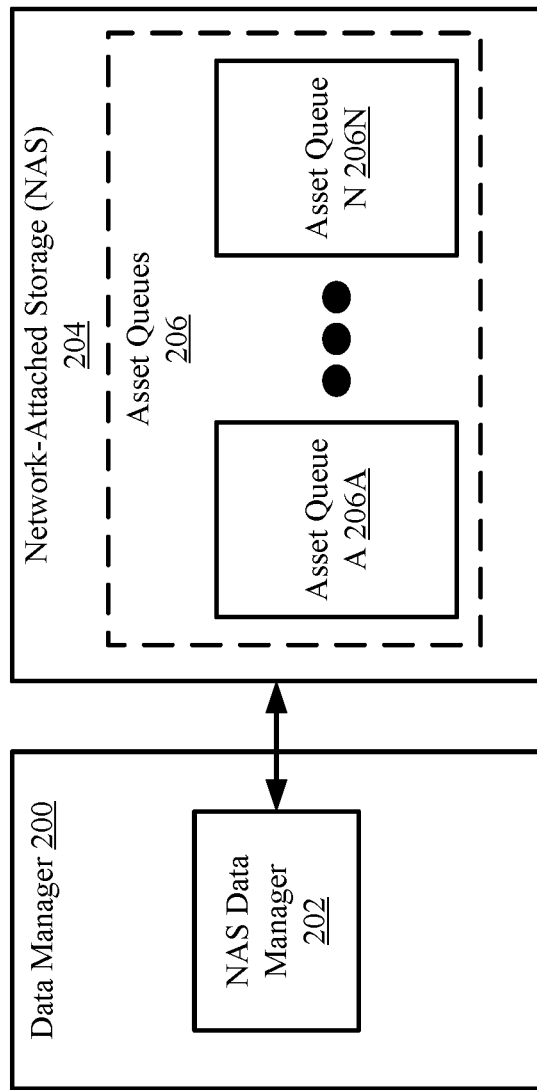
FIG. 2 shows a diagram of a data manager in accordance with one or more embodiments of the technology.

The three above approaches may be used together or separately and may be implemented on the systems shown in FIGS. 1-3.2.

The following describes one or more embodiments.

FIG. 1 shows a diagram of a system in accordance with one or more embodiments described herein. The system (100) may include a data manager (102), a proxy infrastructure (104), one or more primary storage(s) (106), one or more backup storage systems (108), and network-attached storage (NAS) (110). Each of these components is described below.

In one or more embodiments, the components in FIG. 1 may operatively connect to one another through a network (e.g., a local area network (LAN), a wide area network (WAN) such as the Internet, a mobile network, etc.). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the components may communicate with one another using any combination of wired and/or wireless communication protocols.

In one or more embodiments, the data manager (102) is configured to manage the backup of assets from the primary storage(s) (106) to the backup storage(s) (108). The data manager (102) is operatively connected to the network-attached storage (NAS) (110), described in further detail in FIG. 2. The data manager (102) includes functionality to perform some or all of the methods shown in FIGS. 4.1-6.2 (described below).

In one or more embodiments, the data manager (102) may be implemented as a physical computing device or a logical computing device. In one or more embodiments, a physical computing device may be, for example, a laptop computer, a desktop computer, a server, a distributed computing system, or a cloud resource. The physical computing device may include one or more processors, memory (e.g., RAM), and persistent storage (e.g., disk drives, SSDs, etc.). The physical computing device may include instructions, stored in the persistent storage, that when executed by the processor(s) of the physical computing device cause the physical computing device to perform the functionality described throughout this application. In one or more embodiments, the logical computing device may utilize the computing resources of any number of computing devices to provide the functionality of the data manager described throughout this application.

Additional details about the data manager are provided in FIG. 2.

In one or more embodiments, the proxy infrastructure (104) may represent a physical component of the system that assists in the instantiation of proxy hosts for secure backup operations. The proxy infrastructure (104) functions as a go-between between the primary storage(s) (106) and the backup storage(s) (108) as it receives backup requests from the data manager (102). The proxy infrastructure (104) may provide one or more functionalities, for example (but not limited to): load balancing (to distribute traffic evenly among different proxy hosts to prevent any single proxy host from becoming overloaded), controlling and managing proxy hosts, and tearing containers up and down during backup sessions. The proxy infrastructure (104) is a piece of software intended to orchestrate NAS asset protection using a plurality of NAS proxy hosts (304A-304N), and will be discussed at length below. The proxy infrastructure (104) may include functionality to perform some or all of the methods shown in FIGS. 4.1-6.2.

Additional details about the proxy infrastructure are provided in FIGS. 3.1-3.2.

In one or more embodiments, the primary storage(s) (106) may represent a hardware component that is used to store data. In one embodiment, the primary storage (106) may be configured as a storage array (e.g., a network-attached storage (NAS) array), in which a storage array may refer to a collection of one or more physical storage devices. Each physical storage device may include non-transitory computer-readable storage media, in which the data may be stored in whole or in part, and temporarily or permanently.

In one or more embodiments, the backup storage system(s) (108) may represent a data backup, archiving, and/or disaster recovery storage system. The backup storage system (108) may be implemented using one or more servers (not shown). Each server may refer to a physical server, or a virtual server, which may reside in a cloud computing environment. Additionally or alternatively, the backup storage system (108) may be implemented using one or more computing systems similar to the exemplary computing system shown in FIG. 7.

The backup storage system(s) (108) may include functionality to perform some or all of the methods shown in FIGS. 4.1-6.2 (described below).

While FIG. 1 shows a configuration of components, other system (100) configurations may be used without departing from the scope of the technology. In addition, while the components in FIG. 1 are shown as distinct components, one or more of these components may be co-located on the same physical hardware without departing from the technology.

Turning now to FIG. 2, FIG. 2 shows a data manager in accordance with one or more embodiments of the technology. The data manager (200) includes a network-attached storage (NAS) data manager (202) and is operatively connected to the NAS storage (204). Each of the aforementioned components is described below.

In one or more embodiments, the NAS data manager (202) may be implemented in hardware, software, or any combination thereof. The NAS data manager (202) includes functionality to manage the overall backing up of assets from the primary storage to the backup storage system. This functionality may include performing some or all of the steps shown in FIGS. 4.1-6.2.

In one or more embodiments, NAS (204) includes volatile and non-volatile (i.e., persistent) storage. The NAS (204) is used by the NAS data manager to temporarily store slices (described below) in per-asset queues (206). Each of the asset queues (e.g., 206A, 206N) is populated with slices associated with the asset that is being backed-up. The slices are maintained in the aforementioned asset queues (206A, 206N) until they are processed in a backup session. See e.g., FIGS. 4.1-6.2 below.

While FIG. 2 shows a configuration of components, other data manager (200) configurations may be used without departing from the scope of the technology.

Turing now to FIG. 3.1, FIG. 3.1 shows a proxy infrastructure in accordance with one or more embodiments of the technology. The proxy infrastructure (300) may include a proxy manager (302) and one or more proxy hosts (304A-304N). Each of these proxy infrastructure components is described below.

In one or more embodiments, the proxy manager (302) may be implemented using hardware, software, or any combination thereof. In one embodiment, the proxy manager (302) may be implemented using a physical computing device (described above) or a logical computing device (described above).

The proxy manager (FIG. 2, 200) interacts with the data manager (FIG. 2, 200) to facilitate the backing up of assets. More specifically, the proxy manager (302) includes functionality to receive requests to process backup sessions (which includes slices) and, in response to receiving the requests, allocates the appropriate physical or logical infrastructure (also referred to as proxy hosts (e.g., 304A, 304N)) to process the backup sessions (i.e., to transfer the slices in the backup sessions to the backup storage system(s)). To perform the aforementioned functionality, the proxy manager (302) may perform at least some of the steps in FIGS. 4.1-6.2.

In one or more embodiments, the proxy hosts (e.g., 304A, 304N) may be implemented using hardware, software, or any combination thereof and include functionality to process the backup sessions. In one embodiment, the proxy hosts (e.g., 304A, 304N) may be implemented using a physical computing device (described above) or a logical computing device (described above).

While FIG. 3.1 shows a configuration of components, other proxy infrastructure (300) configurations may be used without departing from the scope of the technology.

FIG. 3.2 shows a proxy host in accordance with one or more embodiments of the technology. The proxy host (304) may include one or more containers (e.g., 320A, 320N). Each container may include a container agent (e.g., 322A, 322N) and container storage (e.g., 324A, 324N). Each of these components is described below.

In one or more embodiments, each container (e.g., 320A, 320N) is software executing on a proxy host (e.g., 304) and is managed (directly or indirectly) by the proxy manager (e.g., 302). In one or more embodiments, where the container is executing as an isolated software instance, the container may establish a semi-isolated virtual environment in which to execute one or more application(s) (e.g., container agent (e.g., 322A, 322N). A container may be executing in the "user space" the proxy host (304) operating system (e.g., a layer of software that utilizes low-level system components for the execution of software). As a non-limiting example, a container may be a Docker® container.

In one or more embodiments, the container agent (e.g., 322A, 322N) is software executing in the container that includes functionality to process the backup sessions and to communicate the status of the processing of the backup sessions to the proxy manager. The container agents may also perform zero, one or more of the steps shown in FIGS. 4.1-6.2.

In one or more embodiments, the container storage (e.g., 324A, 324N) is storage (which may be volatile, non-volatile, or any combination thereof) that stores slices that need to be processed by the container agent (e.g., 322A, 322N).

While the container agent has been described to perform a variety of different functions, the container may include multiple distinct applications (or agents); each performing one or more of the aforementioned functions without departing from the technology.

While FIG. 3.2 shows a configuration of components, other proxy host (304) configurations may be used without departing from the scope of the technology.

Proxy Host Reservation

Traditionally, backup sessions are created and provided to the proxy hosts without any understanding of the resources available on the proxy hosts to actually process the backup sessions within the backup window. As a result, if the proxy hosts were resource constrained, then one or more backup sessions would not be processed and the entire backup would fail. In the instant approach, a reservation mechanism would be used to obtain information on the current resources available on the proxy hosts. This information is then used to optimize the number of backup sessions that are created and submitted to the proxy hosts. In this manner, there is better use of the proxy host resources and a lower likelihood that backup sessions provided to the proxy host will not be completed.

FIGS. 4.1-4.3 show flowcharts of a method for orchestrating data streams in accordance with one or more embodiments of the technology. The method shown in FIGS. 4.1-4.3 may be performed by, for example, the NAS data manager (202). Other components of the system in FIGS. 1-3.2 may perform all, or a portion, of the method of FIGS. 4.1-4.3 without departing from the scope of the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

Referring to FIG. 4.1, FIG. 4.1 shows a method for generating slices for assets that are to be backed up. These slices are then processed in accordance with FIGS. 4.2-4.3, FIGS. 5.1-5.4, and FIGS. 6.1-6.2.

Turning to FIG. 4.1, in Step 400, a request to backup an asset is received. In one embodiment, the request may be for a single asset (e.g., a file, a folder, a database, a volume, etc.) or set of assets.

In Step 402, in response to the request in Step 400, a snapshot of the asset is obtained. The snapshot corresponds to a copy of the asset at a given time. In one embodiment, the snapshot may be generated on the primary storage in response to a request from the NAS data manager.

In Step 404, one or more slices of the asset are generated from the snapshot. More specifically, the snapshot is divided in to portions, where each portion of the snapshot is a slice and is associated with a slice identifier (ID). The size of a given slice (or set of slices) may vary based on the implementation of technology.

In Step 406, an asset queue (see e.g., FIG. 2, 206A) for the asset is generated (or otherwise instantiated) on the NAS (FIG. 2, 204). Once generated, the asset queue is populated with slice IDs corresponding to the slices generated in Step 404.

FIGS. 4.2-4.3 describe a method for processing the slices generated in FIG. 4.1. Referring to FIG. 4.2, in Step 410, a populated asset queue is selected. An asset queue is deemed to be populated if it includes at least one slice ID. The selection of a given populated asset queue may be performed using any known or later discovered methods. For example, the selection may be random, may be based on number of slice IDs remaining in the various populated asset queues, may be based on the relative importance of the assets associated with the various populated asset queues. The technology is not limited to the aforementioned examples.

In Step 412, a capacity request is sent to the proxy infrastructure (or more specifically to the proxy manager). The capacity request is used to determine the resource availability of the proxy infrastructure to process the slices associated with the slice IDs in the selected populated asset queue.

In Step 414, a capacity response is received from the proxy infrastructure, which specifies the resource availability of the proxy infrastructure. In one embodiment, the capacity response may specify the number of backup sessions that the proxy infrastructure may process (e.g., which may be processed in parallel) based on its current resource availability. Other measures of resource availability may be specified in the capacity response without departing from the technology.

In Step 416, slices (or more specifically, slice IDs) from the selected populated asset queue are assigned to one or more backup sessions, where each backup session may include up to a specified number of slice IDs and where the number of backup sessions does not exceed the resource availability specified in the capacity response. For example, consider a scenario in which the capacity response specified four backup sessions and that each backup session include up to eight slice IDs. In this scenario, the four backup sessions, each specifying eight slice IDs, are created.

In Step 418, a reservation request is sent to the proxy infrastructure. This reservation request specifies the set of backup sessions that were generated in Step 416. Continuing with the example from Step 416, the reservation request specifies four backup sessions.

In Step 420, a reservation response is received from the proxy infrastructure. The reservation response specifies that the proxy infrastructure is able to process none, some or all of the backup sessions specified in the reservation request. The reservation response may specify (i) the backup sessions that can be processed (i.e., were successfully reserved)

and/or (ii) the backup sessions that cannot be processed (i.e., were unsuccessfully reserved).

In Step 422, a determination is made about whether all backup sessions in the reservation request were successfully reserved (i.e., that the proxy infrastructure is able to process all backup sessions specified in the reservation request). The determination is Step 422 is based on the reservation response. If all backup sessions in the reservation request were not successfully reserved, the method proceeds to Step 424; otherwise, the method proceeds to step 426.

In Step 424, based on the determination made in Step 422 if an entire portion of the backup sessions in the reservation request were not successfully reserved, the slice IDs associated with the backup sessions that were not successfully reserved are placed at the end of the corresponding asset queue.

In Step 426, based on the determination made in Step 422 if an entire portion of the backup sessions in the reservation request were successful, the processing of all backup sessions that were successfully reserved is initiated on the proxy infrastructure. In one embodiment, each backup session is associated with a container (e.g., FIG. 3.2, 320A) on a proxy host (e.g., FIG. 3.2, 304). The container includes functionality to: (i) select a slice ID from the back up session, (ii) read the slice associated with the slice ID from the primary storage and (iii) write the slice to the appropriate location in the backup storage system.

Once all slice IDs in a given session have been processed, i.e., each slice corresponding to a slice ID specified in the backup session has been read from the primary storage and written to the backup storage system, the container agent (FIG. 3.2, 322A) issues a notification to the proxy manager (FIG. 3.1, 302). The proxy manager, in turn, issues a notification to the NAS data manager (FIG. 2, 202).

In one embodiment, once a container has completed processing the backup session, the container is torn down (or otherwise terminated) on the proxy infrastructure to free up resources for other containers to be instantiated.

Referring now to FIG. 4.3, FIG. 4.3 describes how the NAS data manager processes the aforementioned notification from the proxy manager. In Step 430 the NAS data manager receives a notification from the proxy infrastructure that a backup session on one of the containers on a proxy host has been fully processed.

In Step 432, a determination is made about whether there are any remaining populated asset queues. If there are any remaining populated asset queues, the process proceeds to Step 410 (in FIG. 4.2); otherwise, the process ends.

The data manager may perform the method shown in FIGS. 4.2-4.3 each time a backup session has been fully processed. Thus, at any given time, the proxy infrastructure may be processing backup sessions associated with different assets. Further, the method in FIG. 4.1 may be performed concurrently with the method shown in FIGS. 4.2-4.3.

The following describes a non-limiting example that is intended to highlight various aspects of the technology.

Continuing with this example, consider a scenario in which there are ten assets and each of these assets is divided into 80 slices for a total of 800 slices for all ten assets. Once the slices are created, the slice IDs are placed in ten per-asset queues in the data manager (e.g., FIG. 2, 200). Thus, each of the per-asset queues includes 80 slice IDs corresponding to the slices for the asset associated with the per-asset queue.

At a later point in time, the NAS data manager (e.g., FIG. 2, 202) sends a capacity request to the proxy infrastructure (e.g., FIG. 1, 104). In this scenario, the proxy infrastructure issues a capacity response, which indicates that it has capacity for five backup sessions with up to eight slices per backup session. The NAS data manager selects an asset and then obtains 40 slice IDs from the corresponding asset queue to generate five backup sessions with eight slices per backup session.

The NAS data manager subsequently sends a reservation request to the proxy infrastructure, where the reservation request specifies the five backup sessions. The proxy infrastructure, upon receipt of the reservation request, attempts to create five containers (one per backup session) (e.g., FIG. 3.2, 302A, 320N) on the proxy hosts (e.g., FIG. 3.1, 304A, 304N). However, in this scenario, the proxy infrastructure has less capacity then previously indicated when it sent the aforementioned capacity response. As a result, the proxy infrastructure is only able to create four containers and, as such, only process four out of the five backup sessions. Accordingly, the slice IDs associated with the fifth backup session (i.e., the backup session that was created not able to be process at this time) are placed back in the corresponding asset queue.

As the proxy hosts complete processing each of the four backup sessions, the containers used during the process of the backup sessions are terminated, and the processes in FIGS. 4.2-4.3 repeat to process the remaining slices in the asset queues.

Separate Backup Sessions

Traditionally, backup sessions contain a specific number of slices distributed to available proxy hosts based on the number of parallel streams selected by the user as well as the availability of the proxy hosts. As a result, each backup session will wait for all slices in the backup session to be completely backed up before creating a new backup session. This results in parallel streams remaining unused until the new backup session begins, wasting the computer resources (i.e., proxy host availability). In the new approach, described below, each slice is orchestrated as a separate backup session, allowing it to be backed up independently and in parallel to the other slices (which are in their own backup sessions). Moreover, in this new approach, backup sessions of slices for the same asset are not required to execute on the same proxy node as other slices associated with the asset, allowing for maximum utilization of computer resources. In this manner, there is full utilization of the proxy host resources and a lower likelihood that proxy hosts will be idle.

FIGS. 5.1-5.4 show flowcharts of a method for orchestrating data streams in accordance with one or more embodiments of the technology. The method shown in FIGS. 5.1-5.4 may be performed by, for example, the NAS data manager (202). Other components of the system in FIGS. 1-3.2 may perform all, or a portion, of the method of FIGS. 5.1-5.4 without departing from the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

FIGS. 5.1-5.4 show flowcharts of a method for orchestrating data streams in accordance with one or more embodiments of the technology. The method in FIGS. 5.1-5.4 occur after the method in FIG. 4.1 is performed.

Turning to FIG. 5.1, in Step 500, a populated asset queue is selected. Each valid asset queue is populated with slice IDs corresponding to the slices generated in Step 404 (e.g., FIG. 4).

In Step 502, the NAS data manager obtains a parallel configuration setting specified by, e.g., the user. This parallel configuration setting specifies a maximum number of parallel streams. The user may set the number of parallel streams based upon the configuration and/or utilization of the primary storage(s) (FIG. 1, 106).

In Step 504, a set of backup sessions is created based on the selected populated asset queue from Step 500 as well as the parallel configuration setting selected by the user in Step 502. In this method, each backup session created contains only one slice ID from the selected populated asset queue(s).

In Step 506, the proxy infrastructure constraints are determined. The proxy infrastructure constraints specify the maximum number of parallel streams (i.e., concurrent backup sessions) that may execute on each proxy host.

In Step 508, a reservation request is sent to the proxy infrastructure. The reservation request specifies the backup sessions that were generated in Step 504. The number of specified backup sessions in the reservation request does not exceed the proxy infrastructure constraints, which were determined in Step 506. For example, if the proxy infrastructure constraint is 24 backup sessions per proxy host, then the reservation request cannot exceed 24 backup sessions per proxy host. Thus, if there are 28 backup sessions, then the reservation request may specify 24 backup sessions to be executed on one proxy host and four backup sessions to be executed on a second proxy host. Those skilled in the art will appreciate that other methods of dividing the backup sessions across proxy hosts may be used without departing from the technology.

In Step 510, a reservation response is received from the proxy infrastructure. The reservation response specifies that the proxy infrastructure is able to process none, some or all of the backup sessions specified in the reservation request. The reservation response may specify (i) the backup sessions that can be processed (i.e., were successful reserved) and/or (ii) the backup sessions that cannot be processed (i.e., were unsuccessful reserved).

In Step 512, a determination is made about whether all backup sessions in the reservation request were successfully reserved (i.e., that the proxy infrastructure is able to process all backup sessions specified in the reservation request). The determination is Step 512 is based on the reservation response. If all backup sessions in the reservation request were not successfully reserved, the method proceeds to Step 514; otherwise, the method proceeds to Step 516.

In Step 514, when all backup sessions in the reservation request were not successfully reserved, the slice IDs associated with the backup sessions that were not successfully reserved are placed back on the corresponding asset queue.

In Step 516, the processing of all backup sessions that were successfully reserved is initiated on the proxy infrastructure. In one embodiment, each backup session is associated with a container (e.g., FIG. 3.2, 320A) on a proxy host (e.g., FIG. 3.2, 304). The container includes functionality to: (i) select a slice ID from the back up session, (ii) read the slice associated with the slice ID from the primary storage and (iii) write the slice to the appropriate location in the backup storage system.

Once the slice ID in a given backup session has been processed, i.e., the slice corresponding to the slice ID has been read from the primary storage and written to the backup storage system, the container agent (FIG. 3.2, 322A) issues a notification to the proxy manager (FIG. 3.1, 302). The proxy manager, in turn, issues a notification to the NAS data manager (FIG. 2, 202).

In one embodiment, once a container has completed processing the backup session, the container is torn down (or otherwise terminated) on the proxy infrastructure to free up resources for other containers to be instantiated.

Turning to FIG. 5.2, in Step 518, FIG. 5.2 describes how the NAS data manager processes the aforementioned notification from the proxy manager. Turning to Step 518, in Step 518 the NAS data manager receives a notification from the proxy infrastructure that a backup session on one of the containers on a proxy host has been fully processed.

In Step 520, a determination is made about whether there are any remaining populated asset queues. If there are remaining populated asset queues, the process proceeds to Step 522 (in FIG. 5.3 discussed below); otherwise, the process ends.

Turning to FIG. 5.3, in Step 522, a populated asset queue is selected.

In Step 524, a reservation request is sent to the proxy infrastructure. The reservation request specifies the backup sessions that were generated in Step 504. The number of specified backup sessions in the reservation request does not exceed the proxy infrastructure constraints, which were determined in Step 506.

In Step 526, a reservation response is received from the proxy infrastructure. The reservation response specifies that the proxy infrastructure is able to process none, some or all of the backup sessions specified in the reservation request. The reservation response may specify (i) the backup sessions that can be processed (i.e., were successful reserved) and/or (ii) the backup sessions that cannot be processed (i.e., were unsuccessful reserved).

In Step 528, a determination is made about whether all backup sessions in the reservation request were successfully reserved (i.e., that the proxy infrastructure is able to process all backup sessions specified in the reservation request). The determination in Step 528 is based on the reservation response. If all backup sessions in the reservation request were not successfully reserved, the method proceeds to Step 532; otherwise, the method proceeds to Step 530.

In Step 530, when all backup sessions in the reservation request were not successfully reserved, the slice IDs associated with the backup sessions that were not successfully reserved are placed back on the corresponding asset queue.

In Step 532, the processing of all backup sessions that were successfully reserved is initiated on the proxy infrastructure. In one embodiment, each backup session is associated with a container (e.g., FIG. 3.2, 320A) on a proxy host (e.g., FIG. 3.2, 304). The container includes functionality to: (i) select a slice ID from the back up session, (ii) read the slice associated with the slice ID from the primary storage and (iii) write the slice to the appropriate location in the backup storage system. Once Step 532 is complete, the process proceeds to Step 518 (in FIG. 5.2).

In certain scenarios, new resources may become available in the proxy infrastructure, which may allow for additional backup sessions to be processed. FIG. 5.4 shows an in embodiment for detecting and utilizing the new resources in the proxy infrastructure Turning to FIG. 5.4, in Step 534, new proxy infrastructure capacity is detected. The new proxy infrastructure may be additional proxy hosts and/or additional resources on existing and/or new proxy hosts. The data manager may monitor the proxy infrastructure and, based on the monitoring, detect the new proxy infrastructure capacity. Additionally or alternatively, the user (e.g., an administrator) may trigger the method shown in FIG. 5.4 after they have increased the proxy infrastructure capacity.

In Step 536, a determination is made about whether there are any unprocessed backup sessions remaining in the corresponding populated asset queue. If there are unprocessed backup sessions remaining, the method proceeds to Step 538; otherwise, the process ends.

In Step 538, a determination is made about whether proxy infrastructure is operating below the parallel configuration setting. If the backup session is operating below the parallel configuration setting, the method proceeds to Step 522 (in FIG. 5.3); otherwise, the process ends.

The data manager may perform the method shown in FIGS. 5.1-5.3 each time a backup session has been fully processed. Thus, at any given time, the proxy infrastructure may be processing backup sessions associated with different assets. Further, the method in FIG. 4.1 may be performed concurrently with the method shown in FIGS. 5.1-5.4.

The following describes a non-limiting example that is intended to highlight various aspects of the technology.

Turning to the example, consider a scenario in which there are ten assets and each of these assets is divided into 80 slices for a total of 800 slices for all ten assets. Once the slices are created, the slice IDs are placed in ten per-asset queues in the data manager (e.g., FIG. 2, 200). Thus, each of the per-asset queues includes 80 slice IDs corresponding to the slices for the asset associated with the per-asset queue.

At a later point in time, the NAS data manager (e.g., FIG. 2, 202) determines that the number of parallel streams for a given asset is 28 (i.e., the parallel configuration setting) and that that each proxy host processes up to 24 backup sessions in parallel (i.e., the proxy infrastructure constraints). Assume in this example, that the proxy infrastructure includes two proxy hosts that are available to process the slices. Accordingly, the NAS data manager subsequently selects an asset and then obtains 28 slice IDs from the corresponding asset queue to generate 28 backup sessions with one slice per backup session.

The NAS data manager subsequently sends a reservation request to the proxy infrastructure, where the reservation request specifies the 28 backup sessions. The proxy infrastructure, upon receipt of the reservation request, attempts to create 28 containers (one per backup session) (e.g., FIG. 3.2, 302A, 320N) on the proxy hosts (e.g., FIG. 3.1, 304A, 304N). In response, the proxy infrastructure creates 24 containers on one proxy host and four containers on the second proxy host.

As the proxy hosts finishes processing each of the four backup sessions, the containers used to process the backup sessions are terminated, and the process in FIGS. 4.2-4.3 repeats to process the remaining slices in the asset queues.

Maximize Resource Utilization

Traditionally, backup sessions contain a specific number of slices distributed to available proxy hosts based on the number of parallel streams selected by the user as well as the availability of the proxy hosts. As a result, each backup session will wait for all slices in the session to be completely backed up before creating a new backup session. This results in parallel streams remaining unused until the new backup session begins, wasting the computer resources. In the new approach described below, each proxy host is continuously fed slices from the asset queue once the backup of the previous slice has been completed. This method allows for maximum utilization of computer resources, as individual slices will not be held in the asset queue while waiting for a prior batch of slices to be fully completed. In this manner, there is full utilization of the proxy host resources and a lower likelihood that proxy hosts will be idle.

FIGS. 6.1-6.2 show flowcharts of a method for orchestrating data streams in accordance with one or more embodiments of the technology. The method shown in FIGS. 6.1-6.2 may be performed by, for example, the NAS data manager (202). Other components of the system in FIGS. 1-3.2 may perform all, or a portion, of the method of FIGS. 6.1-6.2 without departing from the invention.

All or a portion of the method shown may be performed by one or more components of the system. While the various steps in this flowchart are presented and described sequentially, one of ordinary skill in the relevant art will appreciate that some or all of the steps may be executed in different orders, combined, or omitted, and some or all steps may be executed in parallel.

FIGS. 6.1-6.2 show flowcharts of a method for orchestrating data streams in accordance with one or more embodiments of the technology. The method in FIGS. 6.1-6.2 occur after the method in FIG. 4.1 is performed.

Turning to FIG. 6.1, in Step 600, a populated asset queue is selected.

In Step 602, slices (or more specifically, slice IDs) from the selected populated asset queue are assigned to one or more backup sessions, where each backup session may include up to a specified number of slice IDs and where the number of backup sessions does not exceed the resource availability (e.g., the number of available proxy hosts).

In Step 604, all backup sessions that were generated based on the populated asset queue are initiated on the proxy infrastructure in available containers. In one embodiment, the proxy manager determines: (i) which proxy hosts have sufficient resources to instantiate containers, which are then used to execute the backup sessions and/or (ii) which proxy hosts that currently have containers instantiated thereon should be allocated additional backup sessions to process. The determination of whether a given proxy host has sufficient resources may include, e.g., monitoring the proxy hosts (also referred to as compute nodes) to determine whether a given proxy host is being over utilized (i.e., is operating above a threshold value(s)) or is being under-utilized (i.e., is operating below a threshold value). The threshold values may relate to memory and/or processor usage. If the compute node is operating above a threshold value, backup sessions may not be sent to the compute node for processing (or there may be delay (e.g., a waiting period) prior to sending the backup sessions to a compute node). If the compute node is operating below a threshold value, backup sessions may be preferentially sent to such compute nodes. In one embodiment, each backup session is associated with a container (e.g., FIG. 3.2, 320A) on a proxy host (e.g., FIG. 3.2, 304). The container includes functionality to: (i) select a slice ID from the back up session, (ii) read the slice associated with the slice ID from the primary storage and (iii) write the slice to the appropriate location in the backup storage system.

Once the slice ID in a given backup session have been processed, i.e., the slice corresponding to the slice ID has been read from the primary storage and written to the backup storage system, the container agent (FIG. 3.2, 322A) issues a notification to the proxy manager (FIG. 3.1, 302). The proxy manager, in turn, issues a notification to the NAS data manager (FIG. 2, 202) that the slice has been processed.

Turning to FIG. 6.2, in Step 608, the NAS data manager receives a notification from the proxy infrastructure that the backup session of a slice of an asset has been completed. Therefore, the container that was responsible for backing up the slice of the asset is now available for the next slice in the populated asset queue. Unlike the methods shown in FIGS.

4.2-4.3, and 5.1-5.4, the notification in Step 608 indicates that a particular slice has been processed as opposed to all slices in a backup session have been processed. Further, once Step 604 has been completed, the container that was processing the slice is now terminated.

In Step 610, a determination is made about whether there are any slices remaining in the corresponding populated asset queue. If there are slices remaining in any populated asset queue, the method proceeds to Step 612; if there are no slices remaining in the queue, the method proceeds to Step 614.

In Step 612, the unprocessed slice(s) are selected and reassigned to the newly available container. The method returns to Step 604.

In Step 614, once there are no slices remaining in any asset queue, the corresponding container (i.e., the container that issued the notification received in Step 606) is torn down and removed from the proxy infrastructure, and the process ends.

Figure 7:
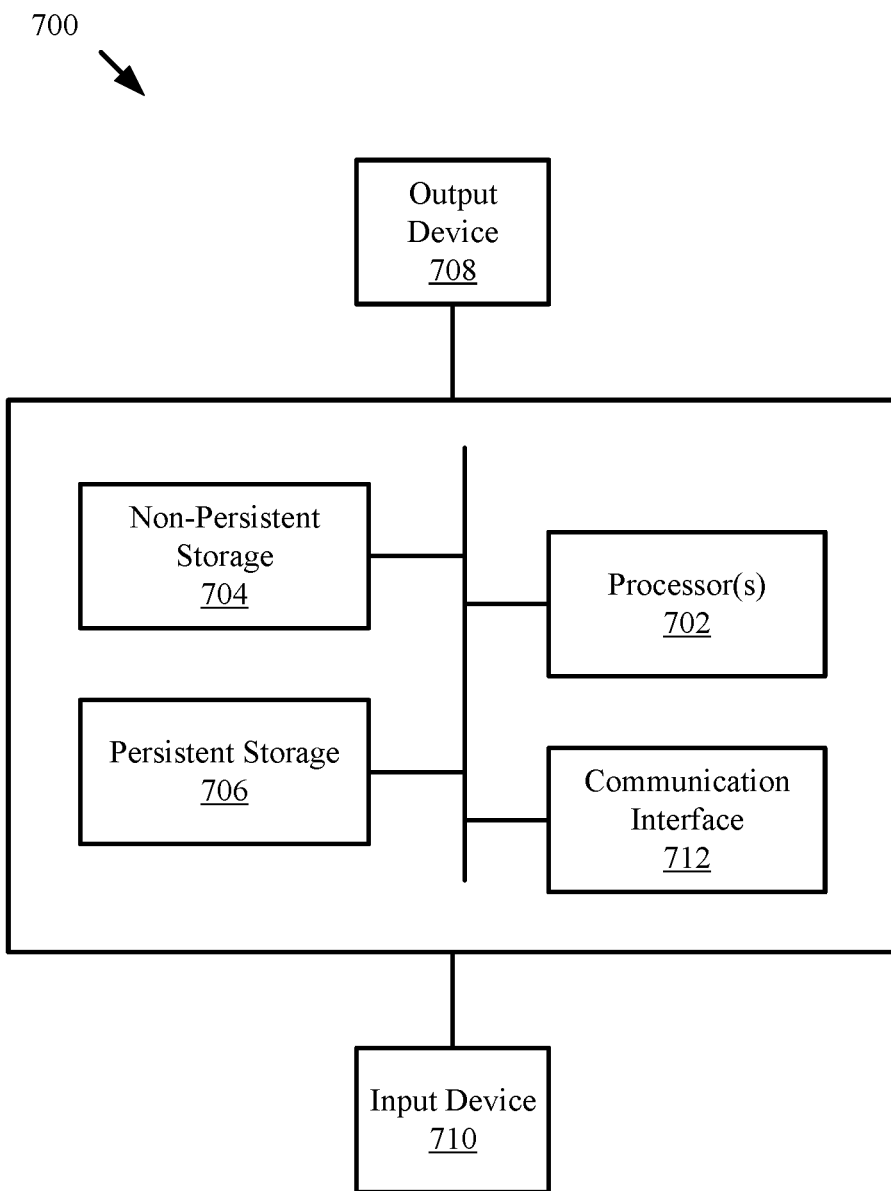
FIG. 7 shows a computing system in accordance with one or more embodiments of the technology.

As discussed above, embodiments described herein may be implemented using computing devices. FIG. 7 shows a diagram of a computing device in accordance with one or more embodiments disclosed. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (908), and numerous other elements (not shown) and functionalities. Each of these components is described below.

In one or more embodiments, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one or more embodiments, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (906). Many diverse types of computing devices exist, and the aforementioned input and output device(s) may take other forms.

The problems discussed above should be understood as being examples of problems solved by embodiments described herein, and the scope of the embodiments should not be limited to solving the same/similar problems. The disclosed technology is broadly applicable to address a range of problems beyond those discussed herein.

One or more embodiments of the technology may be implemented using instructions executed by one or more processors of a computing device. Further, such instructions may correspond to computer readable instructions that are stored on one or more non-transitory computer readable mediums.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for performing a backup operation, the method comprising:
   receiving a backup operation request for an asset;
   receiving a snapshot of the asset;
   generating a plurality of slices of the asset based on the snapshot, wherein each slice comprises a separate portion of the asset, and has an associated slice ID;
   populating a queue comprising the plurality of slice IDs;
   sending a first backup request to a proxy manager to instantiate a container for each of a plurality of backup sessions, wherein each backup session corresponds to a slice ID of the plurality of slice ID;
   instantiating the containers, wherein each container is a respective virtual environment in which to execute one or more applications, and each container reads a slice corresponding to the slice ID corresponding to the container's respective session from a primary storage, and writes the slice to a backup storage;
   receiving, from the proxy manager, a notification that one of the number of backup sessions is complete and a corresponding container has been torn down;
   making a second determination that there is an additional slice of the plurality of slice IDs remains in the queue; and
   sending, based on the second determination, a backup request to the proxy manager to instantiate a new container for the additional slice.

2. The method of claim 1, wherein the asset is data or metadata that is associated with a portion of a data hierarchy.

3. The method of claim 1, further comprising:
   receiving, after sending the backup request, a second notification that a backup session for the additional slice was successful;
   making, after receiving the second notification, a determination that the queue is empty; and
   ending the backup operation based on the determination.

4. The method of claim 1, further comprising:
   obtaining a parallel configuration setting specifying a maximum number of parallel backup sessions that may be executing for the backup operation,
   wherein the first backup request is based on the parallel configuration setting.

5. The method of claim 4, wherein plurality of backup sessions specified in the first backup request does not exceed the parallel configuration setting.

6. The method of claim 1, wherein the proxy manager allocates the backup sessions to proxy hosts based on a proxy infrastructure constraint.

7. The method of claim 6, wherein the proxy infrastructure constraint specifies a maximum number of backup sessions that may execute in parallel on each proxy host.

8. A method for performing a backup operation, the method comprising:
   receiving a backup operation request for an asset;
   identifying a queue comprising a plurality of slice IDs, wherein each slice ID is associated with a slice comprising a separate portion of the asset;
   sending a first backup request to a proxy manager to instantiate a container for each of a plurality of backup sessions, wherein each backup session corresponds to a slice ID of the plurality of slice IDs;
   instantiating the containers, wherein each container is a respective virtual environment in which to execute one or more applications, and each container reads a slice corresponding to the slice ID corresponding to the container's respective session from a primary storage, and writes the slice to a backup storage;
   receiving, from the proxy manager, a notification that one of the number of backup sessions is complete and a corresponding container has been torn down;
   making a second determination that an additional slice ID of the plurality of slice IDs remains in the queue; and
   sending, based on the second determination, a backup request to the proxy manager to instantiate a new container for the additional slice ID.

9. The method of claim 8, wherein the asset is a file or a folder.

10. The method of claim 8, further comprising:
    receiving, after sending the backup request, a second notification that a backup session for the additional slice was successful;
    making, after receiving the second notification, a determination that the queue is empty; and
    ending the backup operation based on the determination.

11. The method of claim 8, further comprising:
    obtaining a parallel configuration setting specifying a maximum number of parallel backup sessions that may be executing for the backup operation,
    wherein the first backup request is based on the parallel configuration setting.

12. The method of claim 11, wherein plurality of backup sessions specified in the first backup request does not exceed the parallel configuration setting.

13. The method of claim 8, wherein the proxy manager allocates the backup sessions to proxy hosts based on a proxy infrastructure constraint.

14. The method of claim 13, wherein the proxy infrastructure constraint specifies a maximum number of backup sessions that may execute in parallel on each proxy host.

15. A method for performing a backup operation, the method comprising:
    receiving a backup operation request for an asset;
    identifying a queue comprising a plurality of slice IDs, wherein each slice ID is associated with a slice comprising a separate portion of the asset;
    sending a first backup request to a proxy manager to instantiate a container for each of a plurality of backup sessions, wherein each backup session corresponds to a slice ID of the plurality of slice IDs;
    instantiating the containers, wherein each container is a respective virtual environment in which to execute one or more applications, and each container reads a slice corresponding to the slice ID corresponding to the container's respective session from a primary storage, and writes the slice to a backup storage;
    receiving, from the proxy manager, a notification that one of the number of backup sessions is complete and a corresponding container has been torn down;
    making a second determination that there is an additional slice ID on a second queue associated with a second asset; and sending, based on the second determination, a backup request to the proxy manager to instantiate a new container for the additional slice ID associated with the second asset.

16. The method of claim 15, wherein the asset is a file or a folder.

17. The method of claim 15, further comprising:
receiving, after sending the backup request, a second notification that a backup session for the additional slice was successful;
making, after receiving the second notification, a determination that the second queue is empty; and
ending a backup operation for the second asset based on the determination.

18. The method of claim 15, further comprising:
obtaining a parallel configuration setting specifying a maximum number of parallel backup sessions that may be executing for the backup operation,
wherein the first backup request is based on the parallel configuration setting.

19. The method of claim 18, wherein plurality of backup sessions specified in the first backup request does not exceed the parallel configuration setting.

20. The method of claim 15, wherein the proxy manager allocates the backup sessions to proxy hosts based on a proxy infrastructure constraint, wherein the proxy infrastructure constraint specifies a maximum number of backup sessions that may execute in parallel on each proxy host.

* * * * *